(12) United States Patent
Foster

(10) Patent No.: US 7,380,652 B2
(45) Date of Patent: Jun. 3, 2008

(54) RECIPROCATING SLAT CONVEYOR

(76) Inventor: Raymond Keith Foster, P.O. Box 1, Madras, OR (US) 97741

( * ) Notice: Subject to any disclaimer, the term of this patent is extended or adjusted under 35 U.S.C. 154(b) by 455 days.

(21) Appl. No.: 11/212,976

(22) Filed: Aug. 27, 2005

(65) Prior Publication Data

US 2007/0045085 A1    Mar. 1, 2007

(51) Int. Cl.
*B65G 25/04* (2006.01)
(52) U.S. Cl. .................................. 198/750.5; 198/750.6
(58) Field of Classification Search ............. 198/750.1, 198/750.2, 750.3, 750.4, 750.5, 750.6, 750.7
See application file for complete search history.

(56) References Cited

U.S. PATENT DOCUMENTS 3,557,931 A * 1/1971 Fernandez ............... 198/750.7
5,839,568 A * 11/1998 Clark ...................... 198/750.5
5,996,773 A * 12/1999 Gist ........................ 198/750.5
6,899,218 B2 * 5/2005 Kwasniewicz et al. .. 198/750.7
6,988,611 B2 * 1/2006 Kwasniewicz et al. .. 198/750.7
7,083,042 B2 * 8/2006 Kwasniewicz et al. .. 198/750.7
2005/0087427 A1 * 4/2005 Trestain ................... 198/750.8

* cited by examiner

*Primary Examiner*—James R Bidwell
(74) *Attorney, Agent, or Firm*—Delbert J. Barnard

(57) ABSTRACT

Separate manifold blocks are connected to the ends of tubular piston rod end portions of linear hydraulic motors that are parts of a drive assembly for a reciprocating slat conveyor. The manifold blocks are removably connected together by bolts and when connected complete passageways in the manifold block assembly that connect the linear hydraulic motors with each other and with pressure and return conduits. The end portions of the linear hydraulic motors are connected to transverse mounting frame members by spaced apart clamp assemblies. The clamp connections stiffen the end portions of the linear hydraulic motors and minimize deflection at the centers of the linear hydraulic motors.

19 Claims, 11 Drawing Sheets

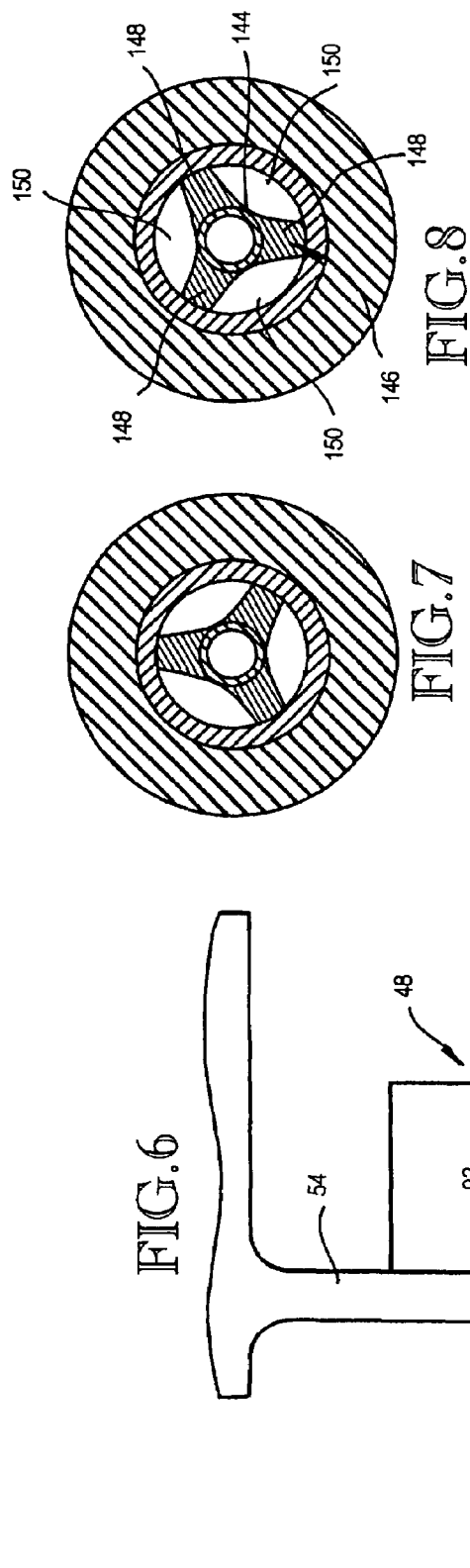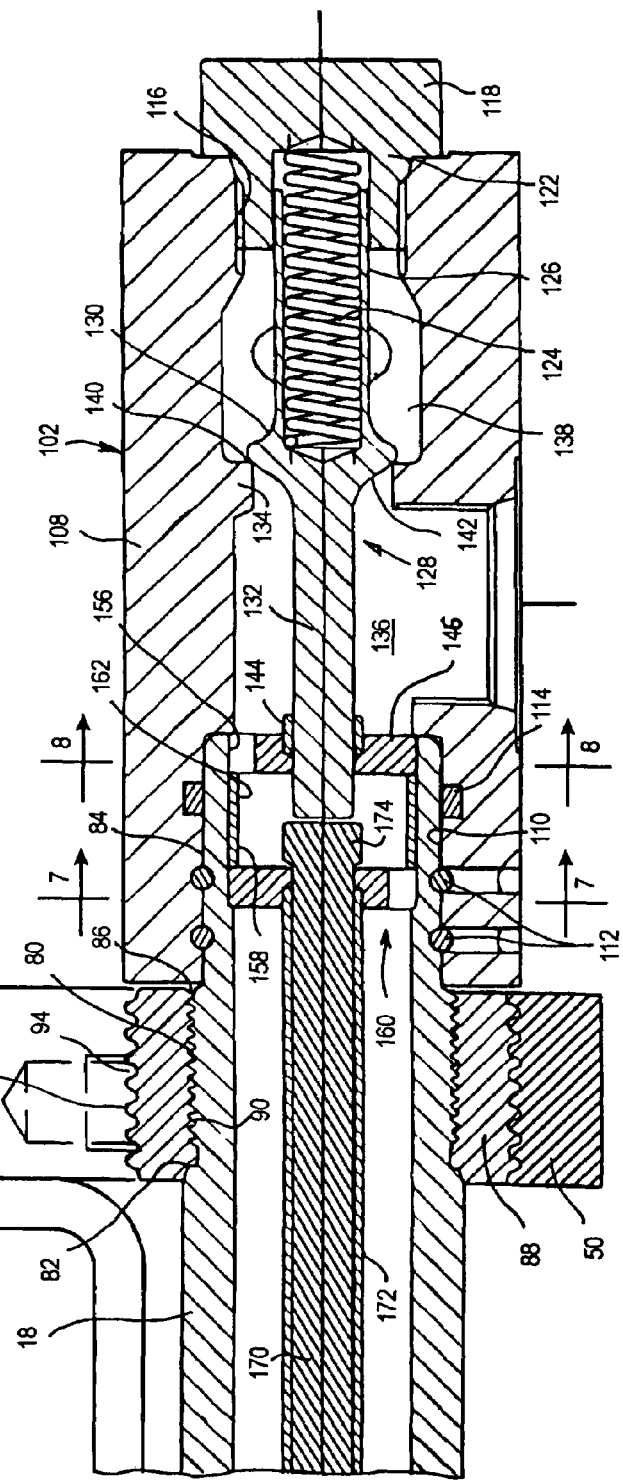

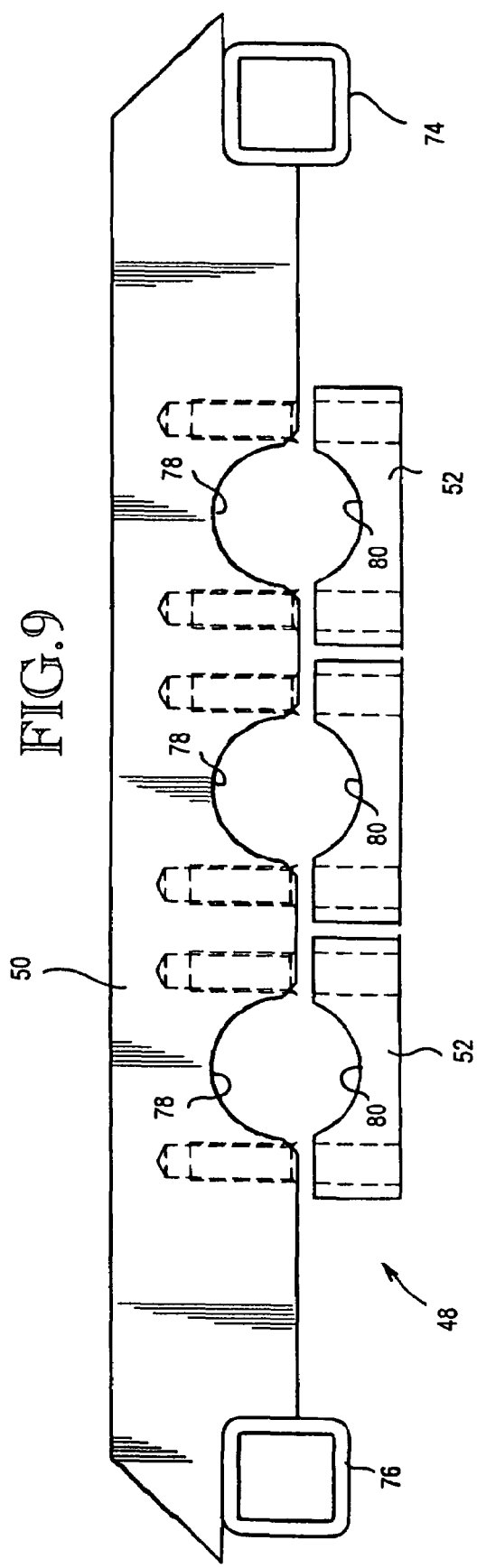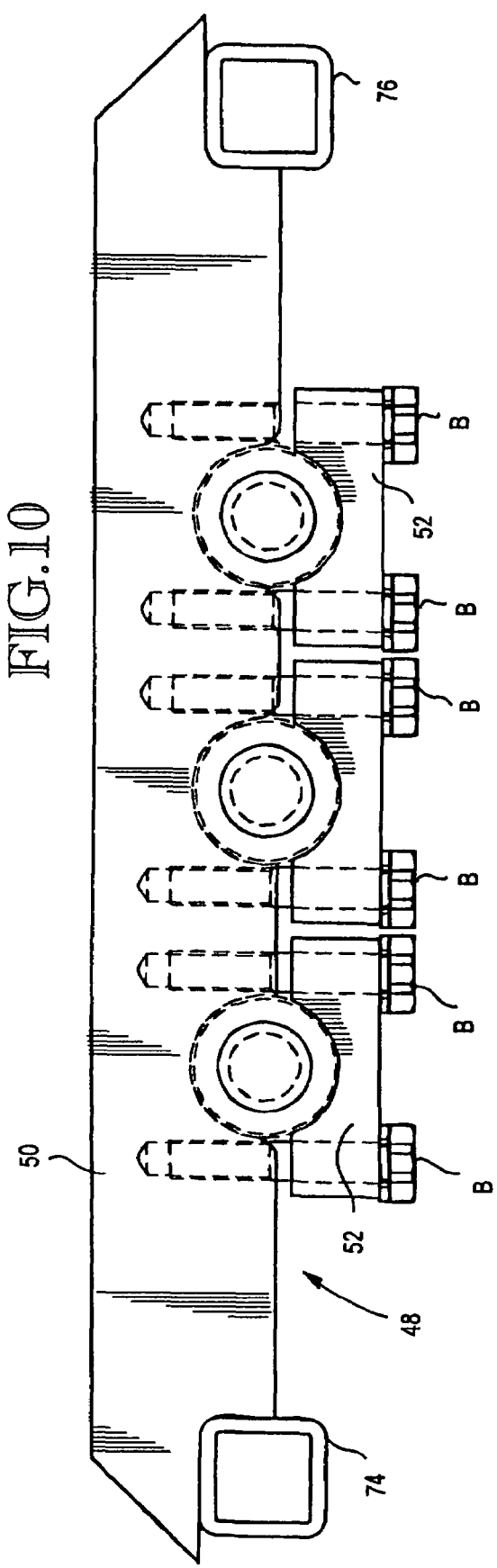

RECIPROCATING SLAT CONVEYOR

TECHNICAL FIELD

This invention relates to improvements in reciprocating slat conveyors and, in particular, to the provision of an improved hydraulic drive and support frame assembly for a reciprocating slat conveyor.

BACKGROUND OF THE INVENTION

The present invention is an improvement on the drive/frame assemblies that are disclosed by my U.S. Pat. No. Re 35,022, granted Aug. 22, 1995, and entitled Reduced Size Drive/Frame Assembly For A Reciprocating Floor Conveyor; by my U.S. Pat. No. 4,712,467, granted Dec. 15, 1987, and entitled Combined Linear Hydraulic Motor And Transfer Valve; and by my U.S. Pat. No. 4,748,893, granted Jun. 7, 1988, and entitled Drive/Frame Assembly For A Reciprocating Floor.

U.S. Pat. No. Re 25,022, discloses fixed piston rods and piston heads and movable cylinders to which transverse drive beams are connected. In the illustrated embodiment, the piston rods are continuous and are clamped at their ends to transverse mounting beams 88, 90. In my U.S. Pat. Nos. 4,712,467 and 4,748,893 the piston rods are divided into first and second parts. The outer ends of the piston rod parts are bolted to transverse mounting frame members. A piston head is provided at the inner end of each piston rod part. The piston rod parts are hollow and serve as passageways for the motive fluid.

In the present invention, the piston rods are divided into two parts, each with a piston head at its inner end. The piston part rods are hollow and serve as passage ways for the motive fluid. A fluid supply and control system is provided that is simpler than the systems disclosed by U.S. Pat. Nos. 4,712,467 and 4,748,893. The outer end portions of the piston rods are clamped to the transverse mounting frame members and sequencing valves are located endwise outwardly of the outer ends of the piston rods.

Providing an improved drive/frame assembly for a reciprocating slat conveyor is the principal object of the present invention. Another object is to provide an improved manifold of sectional instruction that can be easily assembled and disassembled.

BRIEF SUMMARY OF THE INVENTION

Reciprocating slat conveyors of the present invention comprise a plurality of linear hydraulic motors, each of which includes at least one fixed piston rod end portion and a movable cylinder barrel portion. The piston rod end portions are connected to a transverse mounting frame member and the cylinder barrel portions are connected to conveyor slats. The piston rod end portions are hollow. They extend below the mounting frame member and each has an end orifice. Upper clamp members are provided at the opposite sides of the mounting frame member. The upper clamp members include downwardly opening recesses for receiving spaced apart portions of the piston rod end portions. Lower clamp members are provided which have upwardly directed recesses. The piston rod end portions are positionable in the recesses of the upper and lower clamp members. Bolt fasteners are used to connect the lower clamp members to the upper clamp members. When the bolts are tightened, the piston rod end portions are clamped between the upper and lower clamp members and are secured to the transverse mounting frame member. A manifold block is positioned endwise outwardly from each piston rod end portion. The manifold blocks include sockets into which the piston rod end portions project. The manifold blocks also include passageway for the motive fluid that is used in the linear hydraulic motors.

In preferred form, the manifold blocks are removably connected together by bolts. This allows each linear hydraulic motor and its manifold block to be separately removed from the assembly.

In preferred form, each manifold block includes a hollow interior divided by an internal wall into an inner fluid chamber and an outer fluid chamber. The wall includes an outwardly directed valve seat confronting the outer fluid chamber. A valve plug is positioned in the outer fluid chamber. It includes a closure surface confronting the valve seat and further includes a valve operator that extends from the closure plug through the orifice and into the first chamber. The operator includes an inwardly directed inner end. A compression spring is provided in the second fluid chamber and is positioned to bias the valve plug into a seated position against the valve seat. The piston rod end portion includes an elongated control member having an outer end that confronts the inner end of the operator. The compression spring functions to bias the valve plug into a seated position against the valve seat. The elongated control member is movable lengthwise outwardly against the inner end of the valve plug operator for moving the valve plug against the spring and away from the valve seat. This moves the valve plug into an unseated position spaced from the valve seat, resulting in a communication of the inner fluid chamber with the outer fluid chamber through the valve orifice.

Another aspect of the invention involves positioning a second elongated linear hydraulic motor along side of the first linear hydraulic motor. The second linear hydraulic motor includes a tubular piston rod end portion that extends below the mounting frame member and has an outer end orifice situated outwardly of the outer side of the mounting frame member. At least one clamp removably connects the second piston rod end portion to the mounting frame member. A second manifold block is positioned endwise outwardly from the outer end of the second piston rod end portion. The second manifold includes a socket opening in which the outer end of the second piston rod end portion is received. The second manifold block is removably connected to the second piston rod end portion. The second manifold block includes a second internal wall dividing it into an inner chamber and an outer chamber. The internal wall includes an orifice having an outwardly directed valve seat confronting the outer fluid chamber. A valve plug in the outer fluid chamber has a closure surface confronting the valve seat and also has a valve operator that extends from the closure plug through the orifice into the inner fluid chamber. The operator has an inner end. A compression spring is provided in the outer fluid chamber and is positioned bias the valve plug into a seated position against the valve seat. An elongated control member is provided in the piston rod end portion of the second linear hydraulic motor. It has an outer end that confronts the inner end of the valve plug operator. The control member is movable lengthwise outwardly against the inner end of the valve plug operator for moving the valve plug against the spring. This compresses the spring and moves the valve plug into an unseated position away from the valve seat. This communicates the inner fluid chamber with the outer fluid chamber through the valve orifice.

According to an aspect of the invention, a passageway extends from the outer fluid chamber in the first manifold block to the inner fluid chamber in the second manifold block. The first manifold block confronts the second manifold block in the region of this passageway. A seal or ring is provided between the two manifold blocks. It surrounds the passageway and seals against leakage out from the passageway where the two manifold blocks are joined.

At least one bolt is provided for connecting the first manifold block to the second manifold block.

A preferred drive assembly embodiment of the invention comprises a plurality of linear hydraulic motors positioned side-by-side, each having fixed opposite end portions and a movable central portion. The fixed opposite end portions are tubular piston rods having outer ends. A pair of longitudinally spaced apart transverse mounting frame members are provided at the ends of the assembly. Each mounting frame member has a top, bottom and inner and outer sides. The tubular piston rods extend below the mounting frame members and their outer ends are positioned outwardly of the outer sides of the mounting frame members. Longitudinal frame members interconnect the transverse frame members. A transverse drive beam is provided for each linear hydraulic motor. Each transverse drive beam is positioned above the movable central portion of its linear hydraulic motor and it is removably connected to the central portion of its linear hydraulic motor. Clamps are provided at the inner and outer sides of the mounting frame members for removably connecting the piston rod end portions of the linear hydraulic motors to the mounting frame members. The clamps include an upper clamp part connected to the mounting frame member, a detachable lower clamp part, and bolts for connecting the upper and lower clamp parts together when the piston rod end portions of the drive units are between them.

In the preferred embodiment, a separate manifold block is positioned endwise outwardly of the outer end of each piston rod end portion. Each manifold block includes a socket opening in which the outer end of its piston rod end portion is received. Each manifold block is removably connected to its piston rod end portion. Each manifold block has a side port confronting the side port in the adjacent manifold block. A seal ring is positioned between the manifold blocks and it extends around the ports. Detachable connectors connect the manifold blocks together and compress the seal ring.

In preferred form, there is a structural interlock between at least one of the clamps and the linear hydraulic motor with which it is associated. The interlocks may be provided by shoulders and grooves on the end portion of the linear hydraulic motor and complementary shoulders and grooves on the clamp.

An object of the invention is to detachably connect the linear hydraulic motors to the transverse drive beams in such a way that the piston rod end portions are stiffened and the amount of deflection of the linear hydraulic motor is reduced by such stiffening. Another object of the invention is to provide linear hydraulic motors that can be easily and quickly connected to mounting frame members and which include manifold blocks at their ends that can be easily and quickly connected together. The manifold blocks include internal passageways that connect the working chambers of the linear hydraulic motors with each other and with a switching valve and a reversing valve.

Other objects, advantages and features of the invention will become apparent from the description of the best mode set forth below, from the drawings, from the claims and the principles that are embodied in the specific structures that are illustrated and described.

BRIEF DESCRIPTION OF THE SEVERAL VIEWS OF THE DRAWING

Like reference numerals are used to designate like parts throughout the several views of the drawing, and:

FIG. 6 is an enlarge scale view of the right end portion of the linear hydraulic motor shown by FIG. 5;

FIG. 7 is a cross-sectional view taken substantially along line 7-7 of FIG. 6;

FIG. 8 is a cross-sectional view taken substantially along line 8-8 of FIG. 6;

FIG. 9 is an end elevational view of upper and lower clamp parts, with the lower clamp parts being shown to be spaced from the upper clamp parts;

FIG. 10 is a view like FIG. 9 but showing the clamp parts being connected together by bolts and showing end portions of the linear hydraulic motors being clamped by the clamp parts;

BEST MODE FOR CARRYING OUT THE INVENTION

Figure 5:
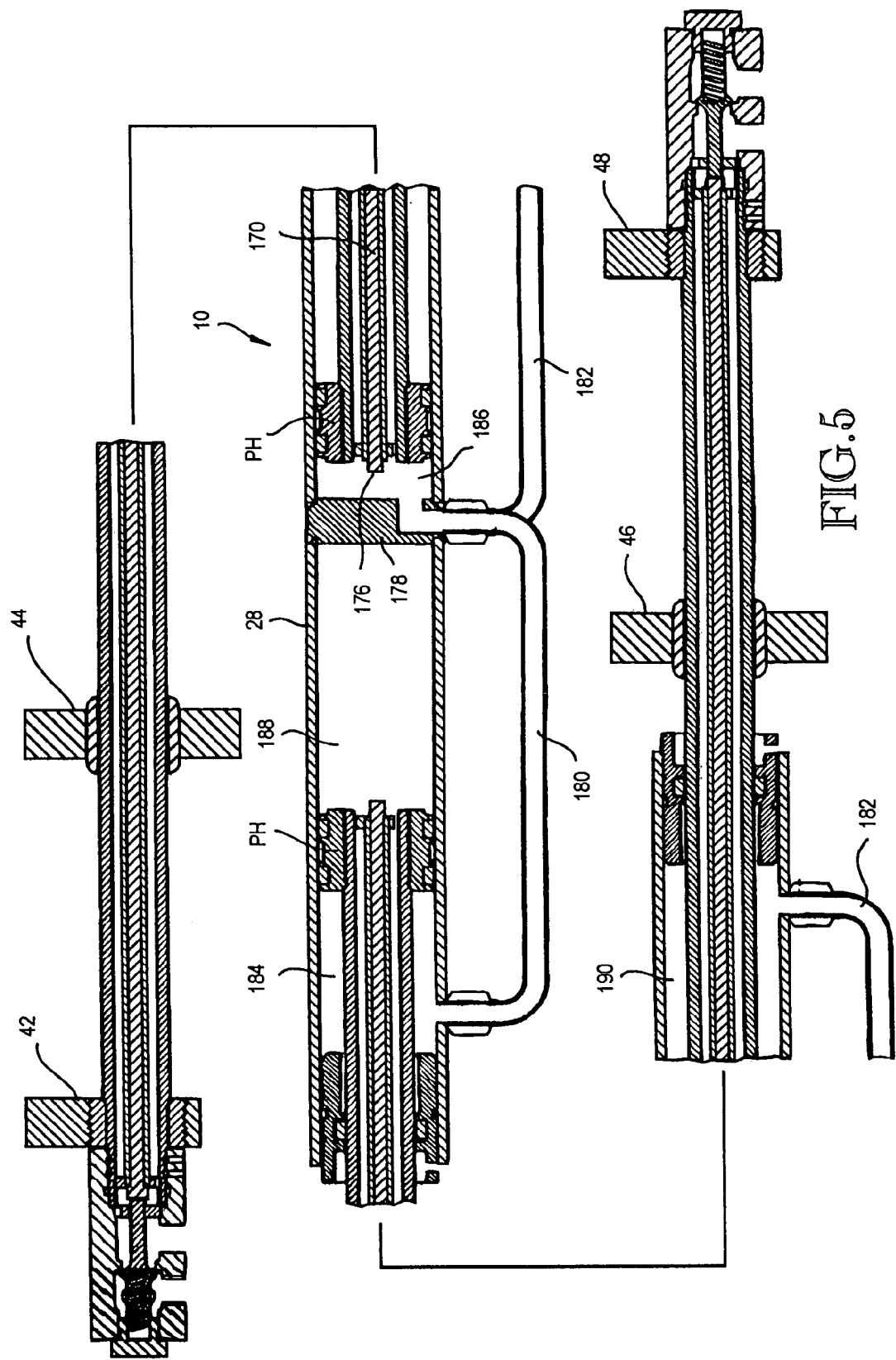
FIG. 5 is a longitudinal sectional view of the type of linear hydraulic motor that is apart of the drive assembly shown by FIGS. 1-4, such view being broken into sections so that a large scale can be used and the entire longitudinal section can be shown on a single page.

FIGS. 1-4 show a drive assembly for a reciprocating class conveyor that includes features of the invention. It comprises three linear hydraulic motors 10, 12, 14 having fixed opposite end portions 16, 18, 20, 22, 24, 26, and movable central portions 28, 30, 32. The end portions 16, 18, 20, 22, 24, 26 are tubular piston rods on which are piston heads PH are provided (FIG. 5). The three linear hydraulic motors 10, 12, 14 are identical in construction and so only one, specifically linear hydraulic motor 10, is illustrated in detail (FIG. 5).

Except for some very important differences, the linear hydraulic motors 10, 12, 14 are like the linear hydraulic motors disclosed in the aforementioned U.S. Pat. No. 4,712, 467. The differences include the manner in which the piston rod end portions 16, 18, 20, 22, 24, 26 are mounted and the construction of the motive fluid distribution passageways leading to and from the linear hydraulic motors 10, 12, 14. The differences can quite easily be seen by comparing FIGS. 11 and 12 herein with FIG. 11 in U.S. Pat. No. 4,712,467.

Figure 1:
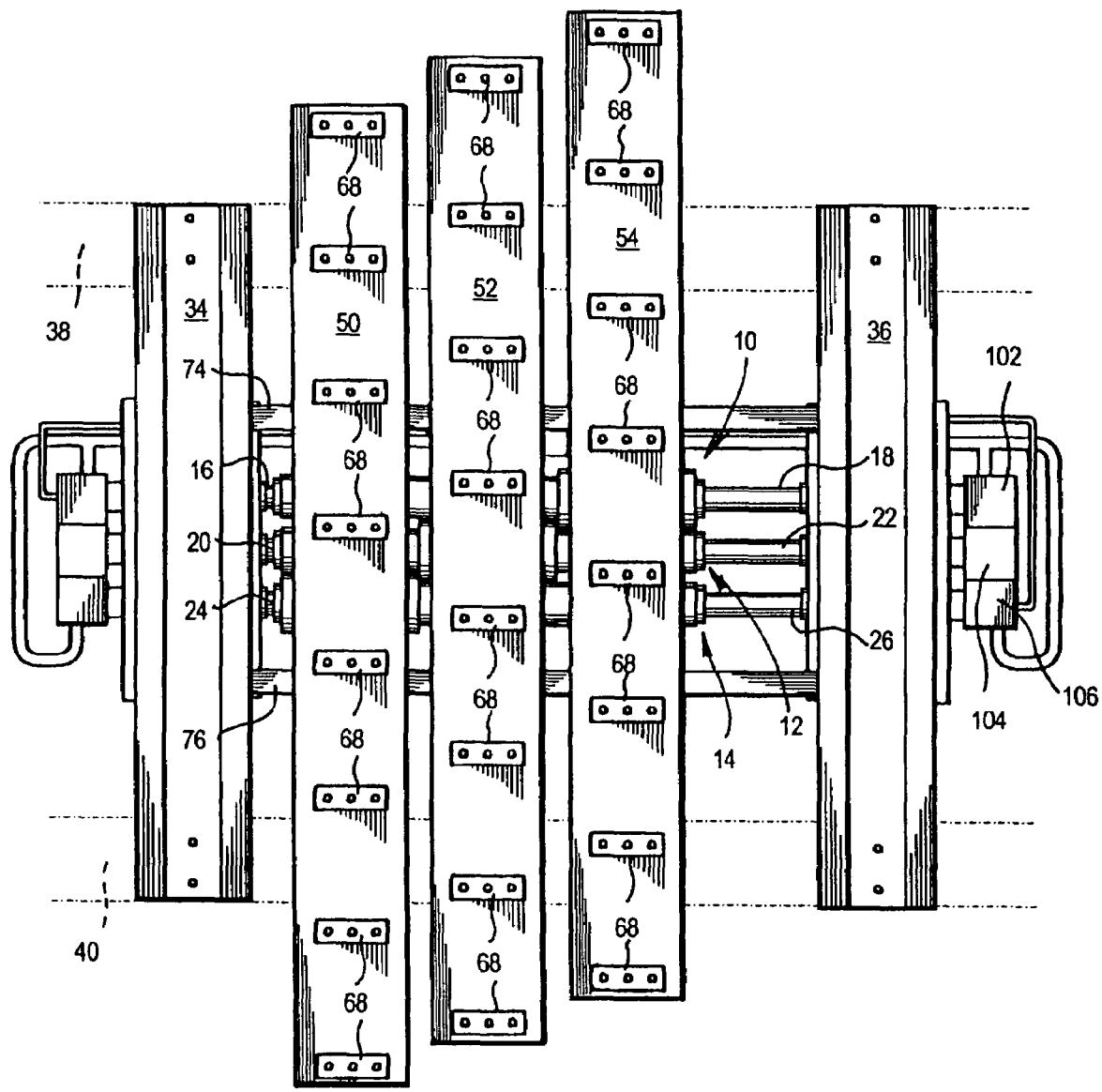
FIG. 1 is a top plan view of a drive assembly for a reciprocating slat conveyor.
Figure 2:
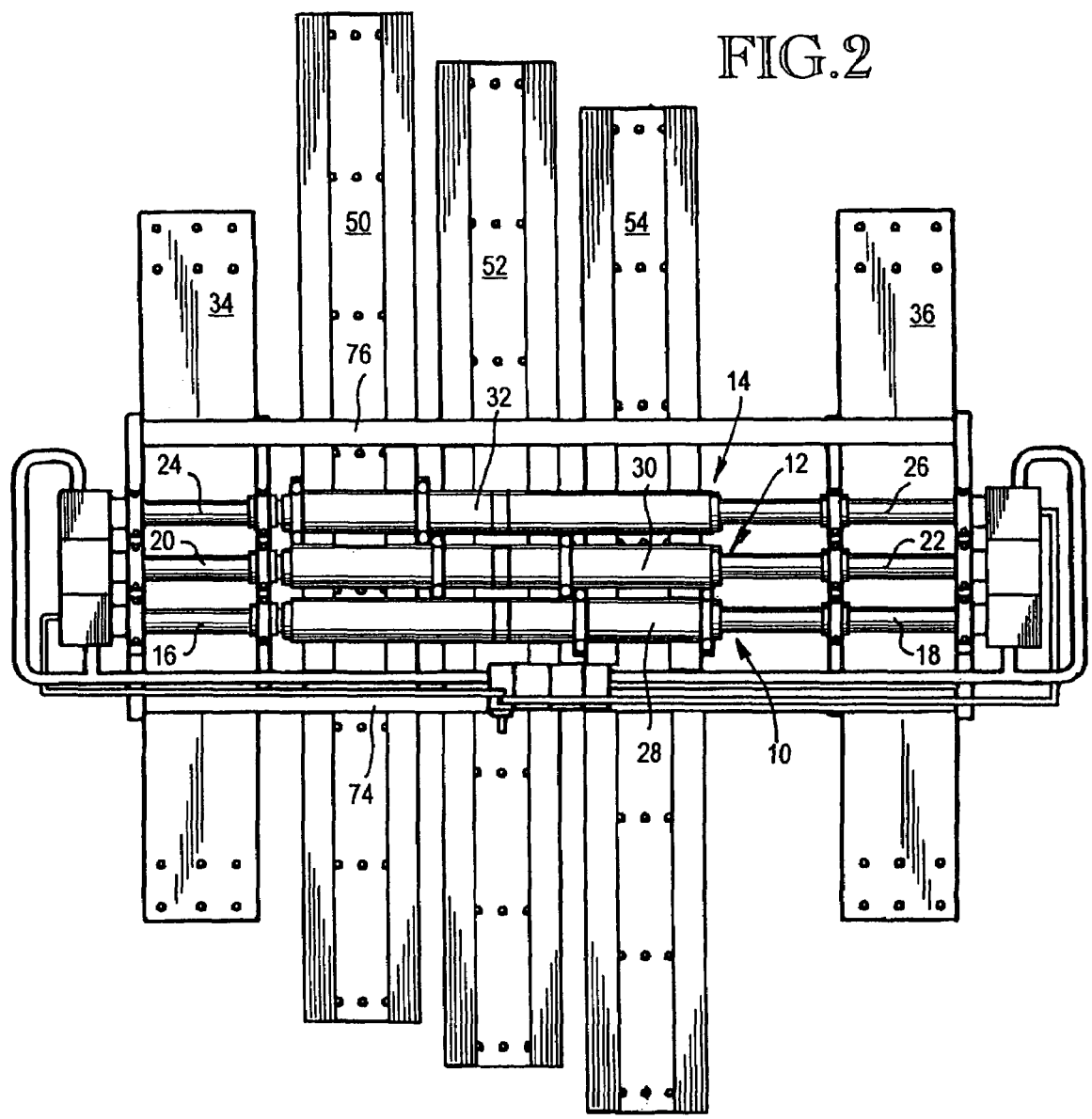
FIG. 2 is a bottom plan view of the drive assembly shown by FIG. 1.
Figure 3:
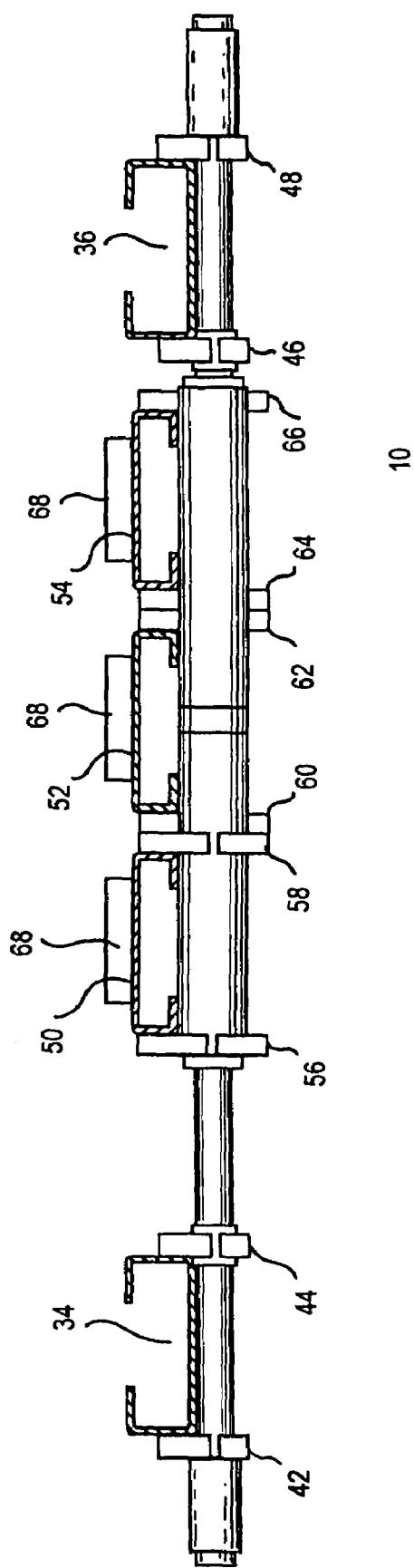
FIG. 3 is an enlarged scale side elevational view of the drive assembly shown by FIGS. 1 and 2.
Figure 4:
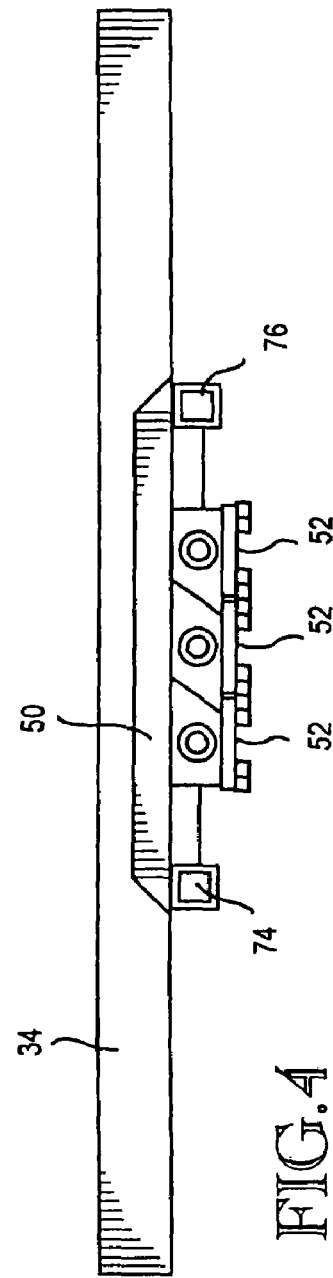
FIG. 4 is an enlarged scale end view of the drive assembly shown by FIGS. 1-3.

Referring to FIGS. 1-4, the drive assembly comprises a pair of longitudinally spaced apart, transverse mounting frame members 34, 36. Mounting frame members 34, 36 are adapted to be connected to a pair of laterally spaced apart longitudinal main frame beams which are shown by broken lines 38, 40 in FIG. 1. FIGS. 1 and 3 show the mounting frame members 34, 36 in the form of upwardly opening lipped channels. The mounting frame members 34, 36 extend over the piston rod end portions 16, 18, 20, 22, 24, 26 and are connected to them by clamp structures 38, 40, 42, 44. Clamp structure 38, 40, 42, 44 comprise upper clamp parts 48 connected to the sides of mounting frame beam 34, 36, detachable lower clamp parts, 50, and bolts 52. The clamp assemblies 38, 40, 42, 44 will be hereinafter described in some detail.

As known in the prior art, the movable central portions 28, 30, 32 of the linear hydraulic drive motors 10, 12, 14 are connected to transverse drive beams 54, 56, 58, such as by clamp assemblies 60, 62, 64, 66, 68, 70. These clamp structures are well-described in the aforementioned U.S. Pat. No. Re 35,022, so there is no need to repeat that description here. The transverse drive beams 54, 56, 58 include connectors 72 for connecting them to the conveyor slats (not shown). In use of the connectors for connecting the transverse drive beams to the conveyor slats is well-described in the aforementioned U.S. Pat. No. 4,748,893, the contents of which are incorporated herein by this specific reference.

The transverse mounting frame beams 34, 36 are connected together by longitudinal beams 74, 76, best shown in FIGS. 1 and 2. In FIGS. 9 and 10 the beams 74, 76 are shown in the form of square tubing. The end portions of the tubing 74, 76 extend below the transverse mounting frame members 34, 36 and are preferably welded to the web portions of such members 34, 36. As shown by both FIGS. 1 and 2, the longitudinal beams 74, 76 are situated outwardly on both sides of the group of linear hydraulic motors 10, 12, 14.

FIGS. 9 and 10 show clamp assembly 42, composed of upper and lower clamp members 48, 50 and clamp bolts 52. The piston rod end portions 16, 18, 20, 22, 24, 26 are placed in the downwardly directed recesses 78 formed in the upper clamp parts 48. Then the lower clamp parts 50 are moved upwardly to place their upwardly opening recesses 80 against the piston rod end portions 16, 18, 20, 22, 24, 26. Then the bolts 52 are installed and tightened so as to screw the bolts into threaded sockets formed in the clamp members 48 and firmly clamp the piston rod end portions 16, 18, 20, 22, 24, 26 to the transverse mounting frame members 34, 36.

FIG. 6 shows piston rod end portion 18 but the figure is representative of all of the piston rod end portions 16, 18, 20, 22, 24, 26. Referring to FIG. 6, a threaded region is provided on the piston rod end portion 18. A radial shoulder 82 is formed at the inner end of the threaded section 80. Outwardly beyond the outer end of the threaded section 80 the end of the piston rod end portion 18 has a reduced diameter, forming a nipple 84 that projects outwardly from a second radial shoulder 86. A ring 88 having internal threads 90 is threaded onto the threaded section 80 and may be tightened until it is against the shoulder 82. The outer circumference of ring 88 is provided with ridges and valleys 92, 94 that are circular. Complementary peaks and valleys 92, 94 are formed in the clamp parts 48, 50 that will receive the rings 58. The peaks 92 on the ring 88 enter into the valleys formed in the clamp parts 48, 50. In similar fashion, the peaks formed on the clamp parts 48, 50 enter into the valleys 94 formed in the rings 88. This provides a structural interlock which prevents the piston rod end portion 18 from moving in position along its axis in response to the longitudinal force imposed on the piston rod end portions 16, 18, 20, 22, 24, 26 by the operation of the linear hydraulic motors 10, 12, 14. A similar interlock is described in the aforementioned U.S. Pat. No. Re 35,022. It is only necessary to provide this interlock between one piston rod end portion 16, 18, 20, 22, 24, 26 and its upper and lower clamp members 48, 50. The reason for this is clearly explained in U.S. Patent No. RE 35,022 which also discloses an interlock but of a different construction.

Figure 13:
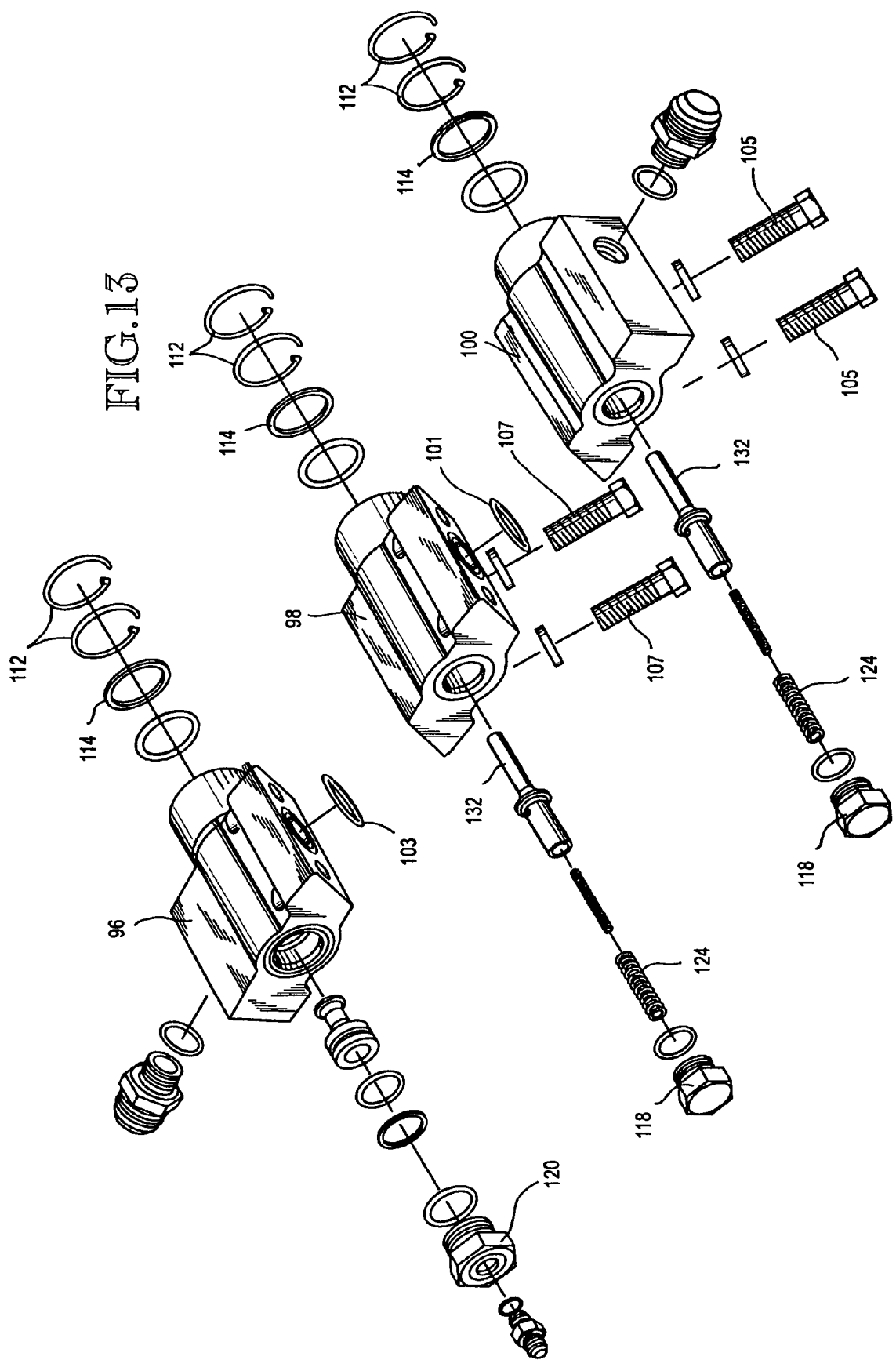
FIG. 13 is an exploded pictorial view of three manifold blocks that are connected to each other and to the outer ends of the tubular piston rod end portions, such view looking towards the outer ends of the manifold block.
Figure 14:
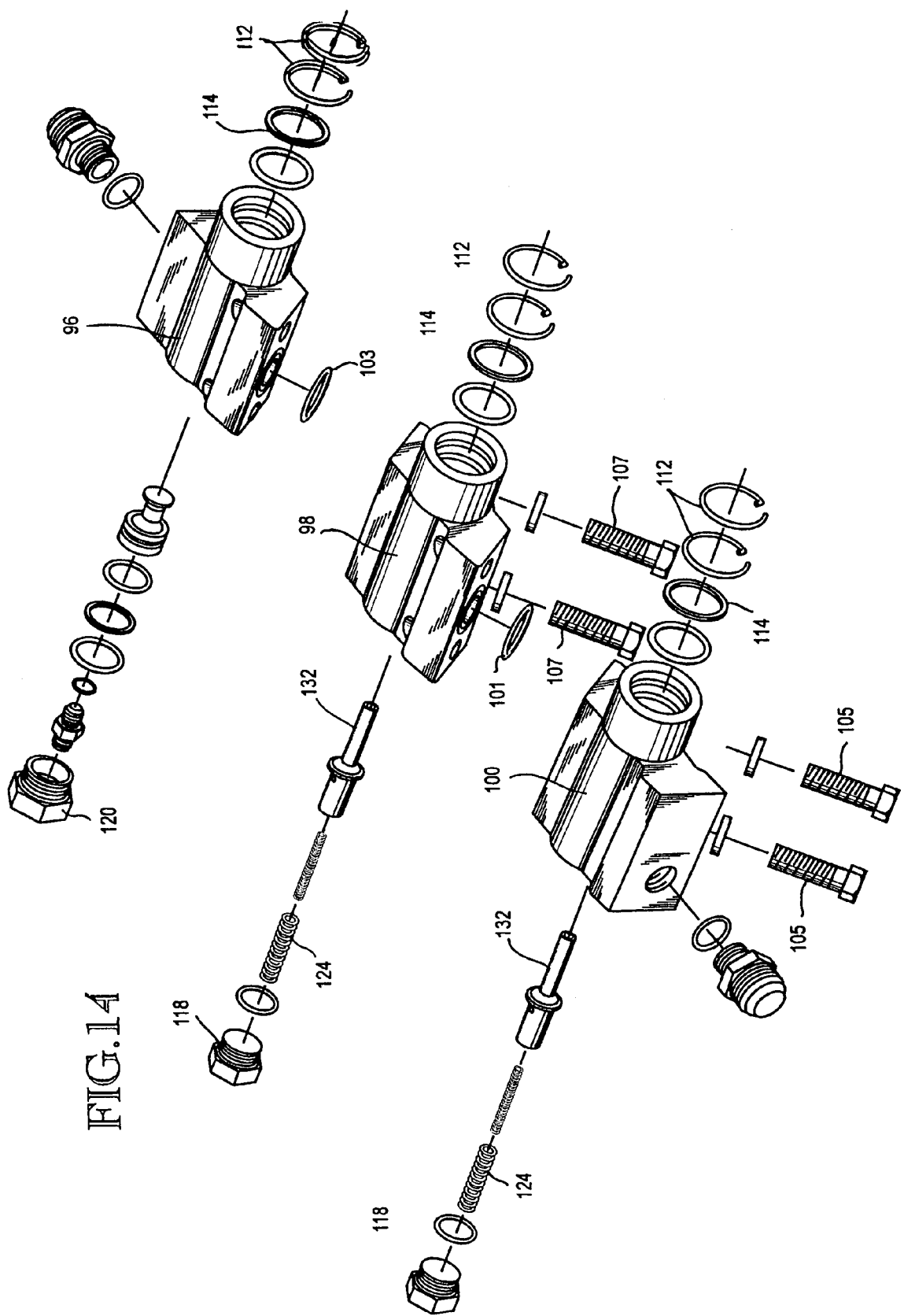
FIG. 14 is another exploded pictorial view of the three manifold blocks, such view looking towards the inner ends of the manifold blocks.

The projecting nipples (e.g. nipple 84 at the end of piston rod end portion 18) are each adapted to receive a manifold block 96, 98, 100, 102, 104, 106. Manifold blocks 96, 98, 100 are shown in some detail in FIGS. 13 and 14. Manifold block 102 is shown in FIG. 6. As shown by FIG. 6, each manifold block 96, 98, 100, 102, 104, 106 comprises a body 108 having an inner end, an outer end, a top, a bottom and two sides. The inner end includes a socket 110 that receives the nipple 84 of its piston rod end portion. Complementary annular grooves are formed in the inner circuit of the socket 110 and on the outer surface of the nipple 84 for receiving lock wires 112. As is well-known to those in the art, when the lock wires 112 are installed, the manifold blocks 96, 98, 100, 102, 104, 106 are locked against movement off from the nipples at the end of the piston rod end portions 16, 18, 20, 22, 24, 26. The inner surface of the socket 110 is also provided with an annular seal ring groove for receiving a seal ring 114. This seal ring 114 prevents seal leakage from the interior of the piston rod end portion and the manifold block in the region of the nipple 84 and the socket 110.

As shown by FIG. 6, the manifold block 102 includes a second socket 116 at its opposite or outer end. This socket 116 is threaded to receive the threads of an end plug. Four of the six end plugs are closure plugs. They are designated 118 in the drawing. The other two end plugs provide a fluid inlet/outlet. They are designated 120 in the drawing. Closure plugs 118 include axially sockets 122 that receive outer end portions of a compression spring 124 and a tubular end portion 126 of a valve plug member 128. Valve plug member 128 includes a valve plug 130 and a valve plug operator 132. The interior of each manifold block 96, 98, 100, 102, 104, 106 includes a cavity divided into two chambers by a radial wall 134. These chambers are an inner chamber 136 and an outer chamber 138. Wall 132 is provided with a valve seat 140 that faces into chamber 138. Valve plug 130 includes a closure surface that confronts the valve seat 140. In FIG. 6, the compression spring 126 is shown extended and functioning to move the closure surface into contact with the valve seat 140. The valve plug operator 132 projects from the valve plug 130 through an orifice in the wall 132. The valve seat 140 borders this orifice 142 on the outer side of the wall 144. Valve plug operator 130 extends axially through inner chamber 132 into a bushing 144 that is carried by a spider 146 (FIG. 8). Spider 146 has three radial arms 148 separated by axial openings or passageways 150. The passageways 150 allow motive fluid to flow passed the spider 146 in either direction.

FIG. 6 shows the nipple 84 provided with a socket 156 that continues axially inwardly into the tubular piston rod end portion to an end formed by a shoulder 158. A second spider 160 is slid into the socket 156 and positioned against the shoulder 158. Then a spacer sleeve 162 is installed into the socket 156 and it is followed by the spider 146. The two spiders 146, 160 and the sleeve 162 are clamped between the shoulder at the base of socket 156 and the shoulder of the base of socket 110. The function of spider 160 will be described below. Spider 146 supports the bearing 144 which in turn supports and centers the valve plug operator 132. Valve plug operator 132 remains in the bushing 144 as it reciprocates during movement of the valve plug 130 towards and away from the valve seat 140.

The aforementioned U.S. Pat. No. 4,712,467 includes a valve control rod 110 that extends longitudinally through each piston rod end portion. A similar control rod 170 may be provided in each piston rod end portion 16, 18, 20, 22, 24, 26. In the illustrated embodiment, a straight control rod 170 is used. It is supported and guided by a tube 172. The outer end of tube 172 fits within a socket formed in the spider 160. The inner end of tube 172 fits within a second spider that is provided at the piston head end of the piston rod end portion (FIG. 5). The control rod 170 is capable of reciprocating longitudinally of the piston rod end portion within the tube 172. In FIG. 6, the control rod 170 is shown to have an enlarged outer end 174. It functions as a stop for limiting the inward movement of the control rod 170. The inner end 176 of the control rod 170 confronts a divider wall 178 that is at the longitudinal center of the cylinder barrel 28, 30, 32. In some installations, it may be desirable to use the particular control rod that is shown in U.S. Pat. No. 4,712,467 in place of the straight rod 170.

Figure 15:
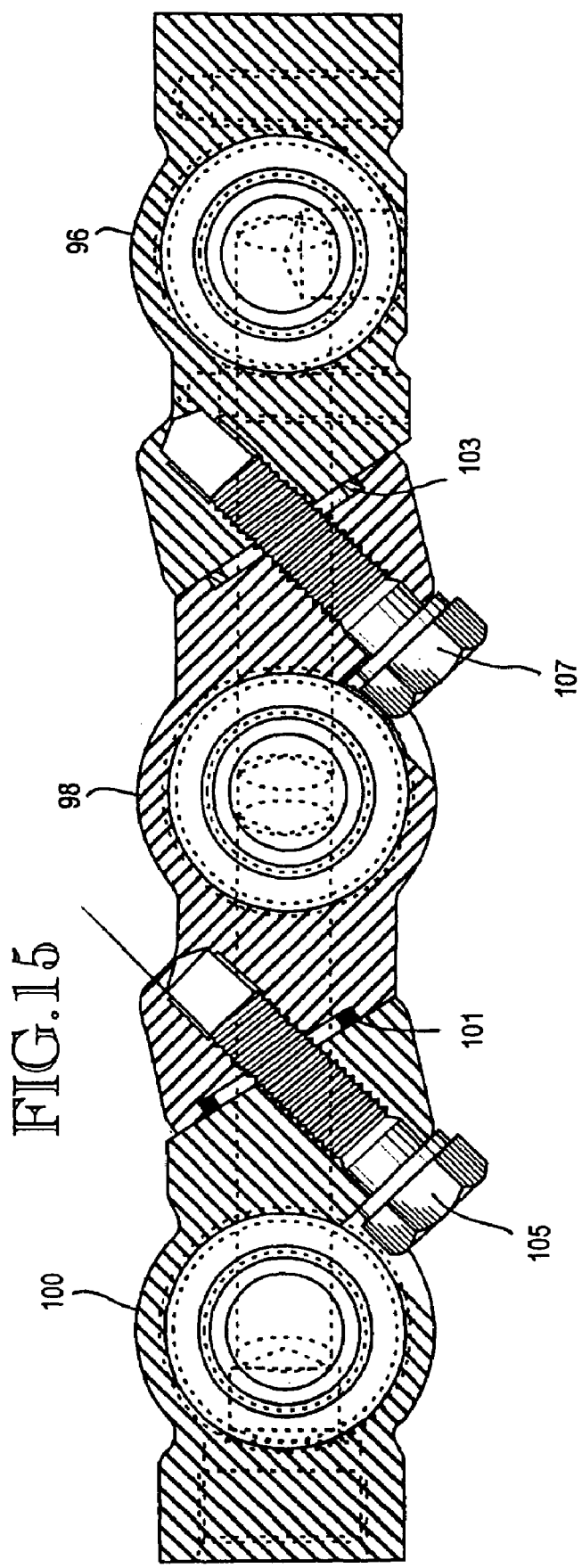
FIG. 15 is a sectional view taken through one of the manifold block assemblies in the region of bolts which are provided for connecting the manifold blocks together.

FIG. 15 best shows the ways that the three manifold blocks 96, 98, 100 are connected together to form a composite manifold. Adjacent blocks 96, 98 and 98, 100 have diagonal abutting surfaces, one of which includes an annular groove that receives a seal ring 101, 103 that surrounds the passageway that extends from one block to the next. Ring 101 surrounds the passageway extending from manifold block 100 to manifold block 98. Ring 103 surrounds the passageway that extends from manifold block 98 to manifold block 96. Bolts 105 extend through manifold block 100 and screw end to manifold block 98. When tightened, the screws 105 secure the manifold blocks 100, 98 together and compress the seal ring 101 so that there is no leakage where the two parts of the passageway meet. In like fashion, bolts 107 extend through manifold block 98 and screw end of manifold block 96. When tightened, the bolts 107 secure manifold block 98 to manifold block 96 and compress the seal ring 103, preventing leakage from the fluid passageway that is surrounded by seal ring 103. This construction of the manifold assembly 96, 98, 100 permits the drive units to be separately removed from the remainder of the assembly.

Figure 11:
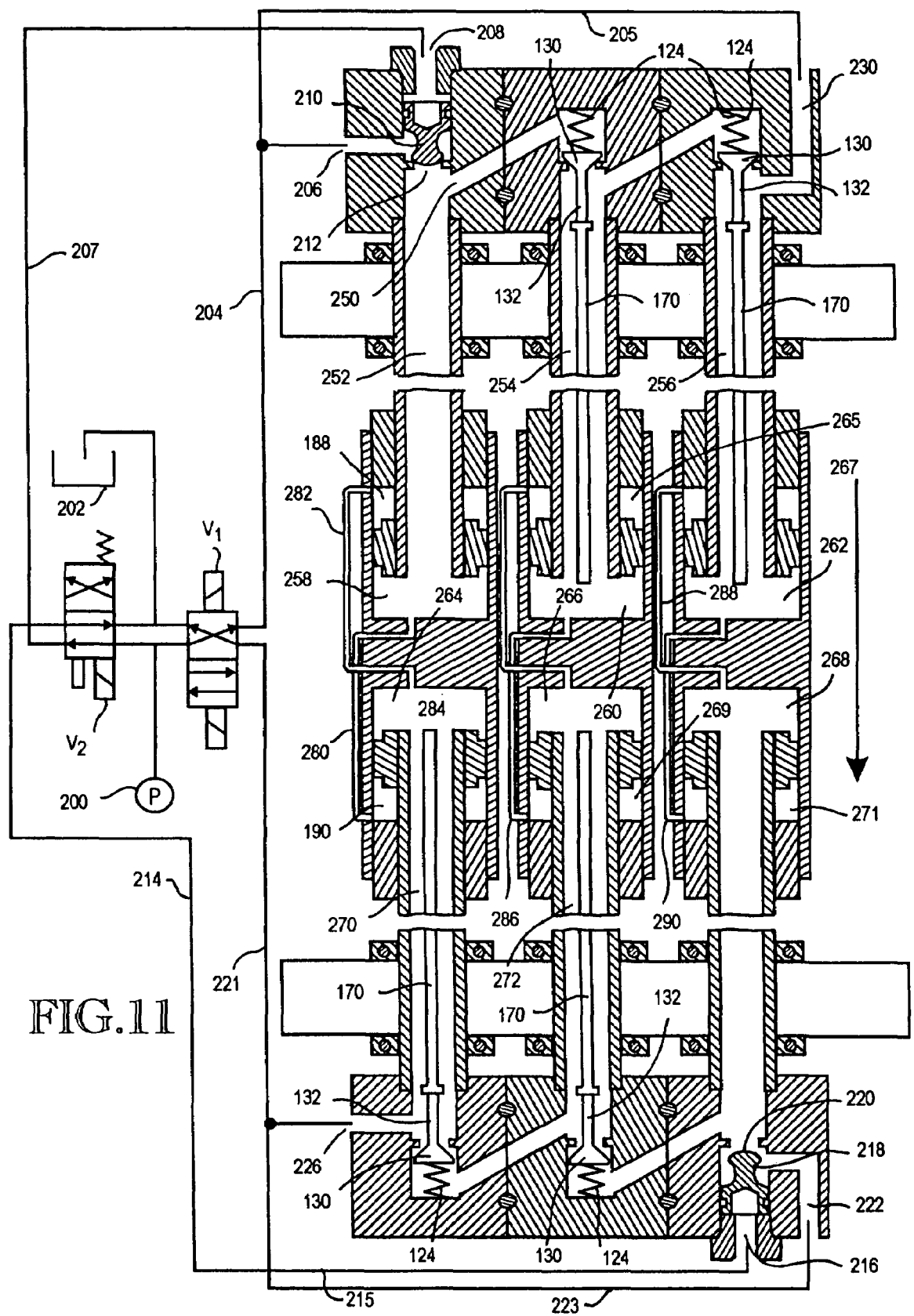
FIG. 11 is a schematic view of the hydraulic fluid delivery and control system for the drive assembly shown by FIGS. 1-10, such view showing the control valves positioned to cause movement of the conveyor slats in the direction of the arrow.
Figure 12:
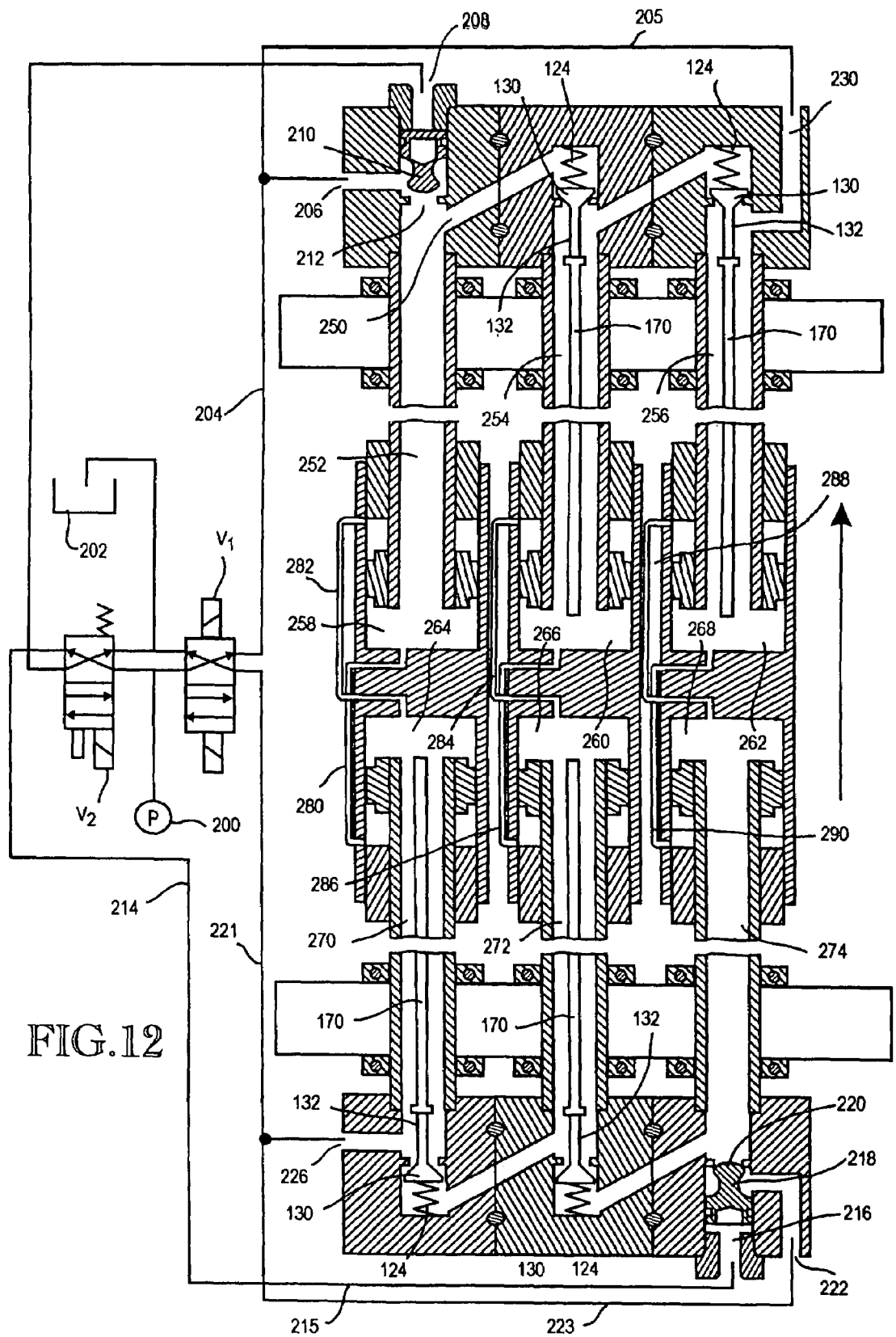
FIG. 12 is a view like FIG. 11 but showing the control valves repositioned to reverse the direction of slat movement.

Referring now to FIGS. 11 and 12, the fluid pressure supply and control system includes two four-way valves, v1, v2. Valve v1 and valves 210, 212 and 218, 220 determine the direction of movement of the conveyor slats. Valve v2 and the valves 130 function to switch the conveyor slats between advancing and retracting.

As is no one by those skilled in the art, when valve v1 is in the position shown by FIG. 11, pressure from pump 200 is transmitted by conduits 204, 205 to ports 206, 230 and conduit 207 communicates pressure to port 208. At the same time, ports 226 and 222 are connected to return or tank 202 by conduits 221, 223. As a result, valve 212 is closed and valve 220 is open. As a result, pressure enters a system through port 230 and leads the system through port 222. The happenings when valve v1 is shifted into its second position will be evident persons skilled in the art. Also, the direction of flow when valve v2 is in its respective positions would be evident to those skilled in the art. The pressure fluid supply and control system is not a part of the invention and for that reason it does not need to be described in any greater detail.

The illustrated embodiments are only examples of the present invention, and therefore, are non-limitive. It is to be understood that many changes in the particular structure, materials and features of the invention may be made without departing from the spirit and scope of the invention. Therefore, it is my intention that my patent rights not be limited by the particular embodiments that are illustrated and described herein, but rather are to be determined by the following claims, interpreted according to accepted doctrines of patent claim construction, including use of the doctrine of equivalents.

The operation of the linear hydraulic motors 10, 12, 14 is basically like operation of the linear hydraulic motors disclosed in U.S. Pat. No. 4,712,467. Accordingly, in order to simplify this document, the construction of the cylinder barrel, the fluid transfer tubes 280, 282, 284, 286, 288, 290 and the working chambers 264, 284, 260, 264, 262, 268 will not be separately described in this document. Rather, references made to U.S. Pat. No. 4,712,467 for a description and understanding of these features and the operation of the linear hydraulic motors 10, 12, 14. It will only be necessary to point out that when the divider walls move against the inner ends of control rods 170, control rods 170 are moved axially outwardly against the valve plug operators 132. This movement moves the valve plugs 130 away from valve seat, allowing fluid flow through the value orifice.

Working chambers 258 and 190 are connected by transfer tube 280. Working chambers 188, 264 are connected by transfer tube 282. Working chambers 260, 269 are connected by transfer tubers 286. Working chambers 266, 265 are connected by transfer tube 284, 262, 271 are connected by transfer tube 290. Working chambers 268, 267 are connected by transfer tube 288. The hallow interiors of the piston rod end portions 16, 18, 20, 22, 24, 26 form fluid passageways that lead into and out from the working chambers 188, 186.

What is claimed is:

1. In a reciprocating slat conveyor comprising a plurality of linear hydraulic motors having fixed piston rod end portions and movable cylinder barrel portions, in which the piston rod end portions are connected to a transverse mounting frame member and the cylinder barrel portions are connected to conveyor slats, the improvement comprising:

said transverse mounting frame member having a bottom and first and second sides;

said piston rod end portions being hollow and extending below the bottom of the mounting frame member to an end orifice;

upper clamp members connected to the sides of the mounting frame member and having downwardly directed recesses for receiving spaced apart portions of the piston rod end portions;

lower clamp members having upwardly directed recesses;

said piston rod end portion being positionable in the recesses of the upper and lower clamp members;

bolt fasteners connecting the lower clamp members to the upper clamp members, for connecting the piston rod end portions to the transverse mounting frame members;

a manifold block positioned endwise outwardly from each piston rod end portion, said manifold blocks including sockets into which the piston rod end portions project, said manifold blocks including fluid passages for motive fluid used in the linear hydraulic motors.

2. The reciprocating slat conveyor of claim 1, wherein the manifold blocks are removably connected together by bolts, whereby the bolts can be removed so that a linear hydraulic motor and its manifold block can be disassembled.

3. A reciprocating slat conveyor, comprising:

an elongated linear hydraulic motor;

a transverse mounting frame member having a top, a bottom, an inner side and an outer side;

said linear hydraulic motor including a tubular piston rod end portion extending below the bottom of the mounting frame member and having an outer end situated outwardly of the outer side of the mounting frame member;

a clamp for removably connecting the piston rod end portion to the mounting frame member;

a manifold block positioned endwise outwardly from the outer end of the piston rod end portion, said manifold block including a socket opening in which the outer end of the piston rod end portion is received;

said manifold block being removably connected to the piston rod end portion;

said manifold block including an internal wall dividing it into an inner fluid chamber and an outer fluid chamber, said wall including an orifice having an outwardly directed valve seat confronting the outer fluid chamber;

a valve plug in the outer chamber having a closure surface confronting the valve seat and including a valve operator that extends from the closure plug through the orifice into the first chamber, said operator having an inner end;

a compression spring in the second fluid chamber positioned to bias the valve plug into a seated position against the valve seat;

an elongated control member in the piston rod end portion having an outer end portion confronting the inner end of the valve plug operator; and said elongated control member being movable lengthwise outwardly against the inner end of the valve plug operator for moving the valve plug against the spring, for compressing the spring and moving the valve plug into an unseated position spaced from the valve seat, so as to communicate the inner and outer fluid chambers in the manifold block with each other through the valve orifice.

4. The reciprocating slat conveyor of claim 3, comprising a second elongated linear hydraulic motor positioned alongside said first linear hydraulic motor, said second linear hydraulic motor including a second tubular piston rod end portion extending below the bottom of the mounting frame member and having an outer end situated outwardly of the outer side of the mounting frame member;

a clamp for removably connecting the second piston rod end portion to the mounting frame member;

a second manifold block positioned endwise outwardly from the outer end of the second piston rod end portion, said second manifold block including a socket opening in which the outer end of the second piston rod end portion is received;

said second manifold block being removably connected to the second piston rod end portion;

said second manifold block including a second internal wall dividing it into a second inner chamber and a second outer chamber, said second internal wall including a second orifice having an outwardly directed second valve seat confronting the second outer fluid chamber;

a second valve plug in the second outer fluid chamber having a second closure surface confronting the second valve seat and including a second valve operator that extends from the second closure plug through the second orifice into the second first fluid chamber, said second operator having a second inner end;

a second compression spring in the second fluid chamber positioned to bias the second valve plug into a seated position against the second valve seat;

a second elongated control member in the second piston rod end portion having a second outer end confronting the second inner end of the second valve plug operator;

said second control member being movable lengthwise outwardly against the second inner end of the second valve plug operator, for moving the second valve plug against the second spring, for compressing the second spring and moving the second valve plug into an unseated position spaced from the second valve seat, so as to communicate the second first fluid chamber and the second fluid chamber in the second fluid manifold with each other through the second valve orifice;

a second passageway extending from the second fluid chamber in the first manifold block to the second first chamber in the second manifold block;

said first manifold block confronting the second manifold block in the region of the second passageway; and a seal ring between the two manifold blocks surrounding the second passageway.

5. The drive assembly of claim 3, comprising a seal ring between the first tubular piston rod end portion and the socket opening in the manifold block.

6. The reciprocating slat conveyor of claim 4, comprising at least one bolt for connecting the second manifold block to the first manifold block.

7. A drive assembly for a reciprocating slat conveyor, comprising:

a plurality of linear hydraulic motors positioned side-by-side and each having fixed opposite end portions and a movable central portion, said fixed opposite end portions being tubular piston rods having outer ends;

a pair of longitudinally spaced apart transverse mounting frame members, each having a top, a bottom and inner and outer sides;

said tubular piston rods extending below the mounting frame members with their outer ends positioned outwardly of the outer sides of the mounting frame members;

longitudinal frame members interconnecting the transverse frame members;

a transverse drive beam for each linear hydraulic motor, each said transverse drive beam being positioned above the movable central portion of its linear hydraulic motor and being removably connected to the central portion of its linear hydraulic motor; and clamps at the inner and outer sides of the mounting frame members for removably connecting the piston rod end portions of the linear hydraulic motors to the mounting frame members, said clamps including an upper clamp part connected to the mounting frame member, a detachable lower clamp part, and bolts for connecting the upper and lower clamp parts together when the piston rod end portions of the drive units are between them.

8. The reciprocating slat conveyor of claim 7, comprising a separate manifold block positioned endwise outwardly of the outer end of each piston rod end portion, each said manifold block including a socket opening in which the outer end of its piston rod end portion is received;
- each said manifold block being removably connected to its piston rod end portion;
- each manifold block having a side port confronting the side port in the adjacent manifold block;
- a seal ring between the manifold blocks surrounding the confronting ports; and
- detachable connectors connecting the manifold blocks together.

9. The drive assembly of claim 7, further comprising longitudinal frame members interconnecting the transverse frame members.

10. The drive assembly of claim 9, wherein the longitudinal frame members are positioned outwardly of the linear hydraulic motors.

11. The drive assembly of claim 7, wherein at least one clamp for each linear hydraulic motor has a structural interlock with the fixed end portion of its linear hydraulic motor, so that the linear hydraulic motor is locked against axially movement relative to the clamp.

12. The drive assembly of claim 11, wherein an end portion of each linear hydraulic motor is thread connected to a surrounding ring and the interlocks are on the ring and the portion of the clamp that contacts said ring.

13. The drive assembly of claim 12, wherein the interlocks comprise shoulders and grooves on the ring and complementary shoulders and grooves on the clamp.

14. A reciprocating slat conveyor, comprising:
- first, second and third linear hydraulic motors, positioned side-by-side;
- said first linear motor having a fixed piston rod end portion that includes an internal fluid passageway;
- said second linear hydraulic motor having a fixed piston rod end portion that includes a motive fluid passageway;
- said third linear hydraulic motor having a fixed piston rod end portion that includes a motive fluid passageway;
- a first manifold block connected to an outer end of the motive fluid passageway in the fixed piston rod end portion of the first linear motor;
- a second manifold block connected to an outer end of the motive fluid passageway in the fixed piston rod end portion of the second linear hydraulic motor;
- a third piston block connected to an outer end of the motive fluid passageway in the fixed piston rod portion for the third linear hydraulic motor;
- each manifold block having a first chamber communicating with the passageway in the piston rod end portion this is connected to said manifold block, a second chamber, and a valve seat between the first and second chambers;
- a fluid passageway in the first manifold block communicating with the first chamber in the first manifold block;
- a fluid passageway connecting the second chamber of the first manifold block with the first chamber of the second manifold block, said fluid passageway having a first part in the first manifold block and a second part in the second manifold block;
- a fluid passageway connecting the second chamber of the second manifold block with the first chamber in the third manifold block, said passageway having a first part in the second manifold block and a second part in the third manifold block;
- a fluid passageway in the third manifold block communicating with the second chamber in the third manifold block;
- a first valve plug in the second chamber of the first manifold block confronting the valve seat in the first manifold block;
- a second valve plug in the second chamber of the second manifold block confronting the valve seat in the second manifold block; and
- a third valve plug in the second chamber of the third manifold block confronting the valve seat in the third manifold block.

15. A reciprocating slat conveyor of claim 14, wherein the first manifold block includes a side boundary and the second manifold block includes a confronting side boundary.

16. A reciprocating floor conveyor according to claim 15, wherein the first and second parts of the fluid passageway that connect the second chamber of the first manifold block with the first chamber of the second manifold block includes a seal ring surrounding the passageway where the two parts of the passageway meet at the confronting side boundaries of the first and second manifold blocks.

17. A reciprocating floor conveyor according to claim 14, wherein the first and second parts of the fluid passageway that connect the second chamber of the second manifold block with the first chamber of the third manifold block includes a seal ring surrounding the passageway where the two parts of the passageway meet at the confronting sides of the second and third manifold blocks.

18. The reciprocating slat conveyor of claim 14, including screw fasteners for detachably connecting the first and second manifold blocks together and screw fasteners for connecting the second and third manifold blocks together.

19. The reciprocating slot conveyor of claim 18, including screw fasteners for detachably connecting the second and third manifolds together.

* * * * *